(12) United States Patent
Joshi et al.

(10) Patent No.: US 8,750,645 B2
(45) Date of Patent: Jun. 10, 2014

(54) GENERATING A COMPOSITE IMAGE FROM VIDEO FRAMES

(75) Inventors: Neel Suresh Joshi, Seattle, WA (US);
Sing Bing Kang, Redmond, WA (US);
Michael F. Cohen, Seattle, WA (US);
Kalyan Krishna Sunkavalli, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 12/634,699

(22) Filed: Dec. 10, 2009

(65) Prior Publication Data
US 2011/0142370 A1 Jun. 16, 2011

(51) Int. Cl.
*G06K 9/32* (2006.01)
*G06K 9/36* (2006.01)

(52) U.S. Cl.
USPC .......................................... 382/284; 382/294

(58) Field of Classification Search
USPC ........ 358/3.26, 3.27, 520, 463; 382/252, 255, 382/260, 274, 275, 263, 307; 348/222.1, 348/239, 584
See application file for complete search history.

(56) References Cited

U.S. PATENT DOCUMENTS

| | | | |
|---|---|---|---|
| 5,579,054 A | | 11/1996 | Sezan et al. |
| 5,657,402 A | * | 8/1997 | Bender et al. ................. 382/284 |
| 5,696,848 A | * | 12/1997 | Patti et al. ..................... 382/254 |
| 6,139,197 A | * | 10/2000 | Banks ........................... 709/217 |
| 6,307,550 B1 | | 10/2001 | Chen et al. |
| 7,239,805 B2 | * | 7/2007 | Uyttendaele et al. ......... 396/222 |
| 7,684,645 B2 | * | 3/2010 | Vitsnudel et al. ............. 382/284 |
| 8,068,693 B2 | * | 11/2011 | Sorek et al. ................... 382/284 |
| 2003/0235344 A1 | * | 12/2003 | Kang et al. .................... 382/284 |
| 2007/0160268 A1 | * | 7/2007 | Uchida ......................... 382/118 |
| 2008/0298639 A1 | * | 12/2008 | Tsunekawa et al. .......... 382/107 |
| 2009/0232213 A1 | * | 9/2009 | Jia ............................. 375/240.16 |
| 2010/0008580 A1 | * | 1/2010 | Mizuno ......................... 382/176 |
| 2010/0220939 A1 | * | 9/2010 | Tourapis et al. .............. 382/261 |

OTHER PUBLICATIONS

Franksens et al, Optical flow based super-resolution: A probabilistic approach, Computer Vision and Image Understanding, vol. 106, Issue 1, Apr. 2007, pp. 106-115.*
S. Farsiu, D. Robinson, M. Elad, and P. Milanfar, "Fast and robust multiframe super-resolution," IEEE Trans. Image Process., vol. 13, No. 10, pp. 1327-1344, Oct. 2004.*
S. Kanumuri, O. G. Guleryuz and M. R. Civanlar, "Fast super-resolution reconstructions of mobile video using warped transforms and adaptive thresholding," Proc. SPIE Conf. on Applications of Digital Image Processing XXX, San Diego, CA, Aug. 2007.*
Jiangang Yu, Bir Bhanu: Super-resolution Restoration of Facial Images in Video. ICPR (4) 2006: 342-345.*

(Continued)

*Primary Examiner* — Andrae S Allison
(74) *Attorney, Agent, or Firm* — Steve Wight; Carole Boelitz; Micky Minhas

(57) ABSTRACT

A method described herein includes acts of receiving a sequence of images of a scene and receiving an indication of a reference image in the sequence of images. The method further includes an act of automatically assigning one or more weights independently to each pixel in each image in the sequence of images of the scene. Additionally, the method includes an act of automatically generating a composite image based at least in part upon the one or more weights assigned to each pixel in each image in the sequence of images of the scene.

19 Claims, 7 Drawing Sheets

(56) References Cited

OTHER PUBLICATIONS van Eekeren, A.; Schutte, K.; Dijk, J.; de Lange, D.J.J.; van Vliet, L.J.; , "Super-Resolution on Moving Objects and Background," Image Processing, 2006 IEEE International Conference on, vol., no., pp. 2709-2712, Oct. 8-11, 2006.*

Eekeren, Motion Deblurring and Super-resolution from an Image Sequence, Proceedings of the Fourth European Conference on Computer Vision, 1996.*

J. Sun, Z. Xu, and H.-Y. Shum. Image super-resolution using gradient profile prior. In Computer Vision and Pattern Recognition, 2008. CVPR 2008. IEEE Conference on, pp. 1-8, 2008.*

Omer et al, Region-Based Super Resolution for Video Sequences Considering Registration Error, T. Wada, F. Huang, and S. Lin (Eds.): PSIVT 2009, LNCS 5414, pp. 944-954, 2009.*

Chao Wang; Qiong Yang; Xiaoou Tang; Zhongfu Ye, "Salience Preserving Image Fusion with Dynamic Range Compression," Image Processing, 2006 IEEE International Conference on, vol., no., pp. 989,992, Oct. 8-11, 2006.*

"Extract Still Image Sequences from Video Clips with AVCutty", Oct. 25, 2006, Retrieved at <<http://labnol.blogspot.com/2006/10/extract-still-image-sequences-from.html>>, p. 1.

Madhusudhan, et al., "Generation of Super-Resolution Video from Low Resolution Video Sequences: A Novel Approach" Dec. 13-15, 2007, International Conference on Computational Intelligence and Multimedia Applications 2007, Retrieved at <<http://ieeexplore.ieee.org/stamp/stamp.jsp?tp=&arnumber=4426372&isnumber=4426319>>, pp. 225-232.

Kara, et al., "A Blind Image Super-Resolution Algorithm for Pure Translational Motion", 2006, Retrieved at <<http://www.eurasip.org/Proceedings/Eusipco/Eusipco2006/papers/1568982334.pdf>>, pp. 1-5.

Agarwala, et al., "Interactive Digital Photomontage", To appear in the ACM SIGGRAPH '04 conference proceedings, Retrieved at <<http://grail.cs.washington.edu/projects/photomontage/photomontage.pdf>>, pp. 1-9.

Cohen, et al., "Image Stacks", Retrieved at << http://research.microsoft.com/pubs/70011/tr-2003-40.pdf>>, pp. 1-4.

Itti, et al., "A Principled Approach to Detecting Surprising Events in Video", In press, Proc. IEEE Int'l Conf. on Computer Vision and Pattern Recognition (CVPR), Jun. 2005, Retrieved at <<http://ilab.usc.edu/publications/doc/Itti_Baldi05cypr.pdf>>, pp. 1-7.

Levin, et al., "Image and Depth from a Conventional Camera with a Coded Aperture", Retrieved at <<http://groups.csail.mitedu/graphics/CodedAperture/CodedAperture-LevinEtAl-SIGGRAPH07.pdf>>, pp. 1-9.

Liu, et al., "Automatic Estimation and Removal of Noise from a Single Image", IEEE Transactions on Pattern Analysis and Machine Intelligence, vol. 30, No. 2, Feb. 2008, Retrieved at <<http://people.csail.mit.edu/billf/papers/denoise_TPAMI.pdf>>, pp. 299-314.

Lowe, et al., "Distinctive Image Features from Scale-Invariant Keypoints", Accepted for publication in the International Journal of Computer Vision, 2004, Retrieved at <<http://people.cs.ubc.ca/~lowe/papers/ijcv04.pdf>>, pp. 1-28.

Lucas, et al., "An Iterative Image Registration Technique with an Application to Stereo Vision.", Retrieved at <<http://dli.iiit.ac.in/ijcai/IJCAI-81-VOL-2/PDF/017.pdf>>, pp. 674-679.

Teodosio, et al., "Salient Video Stills: Content and Context Preserved", Retrieved at <<http://www.teodosio.com/acm93salient.pdf>>, pp. 1-8.

* cited by examiner

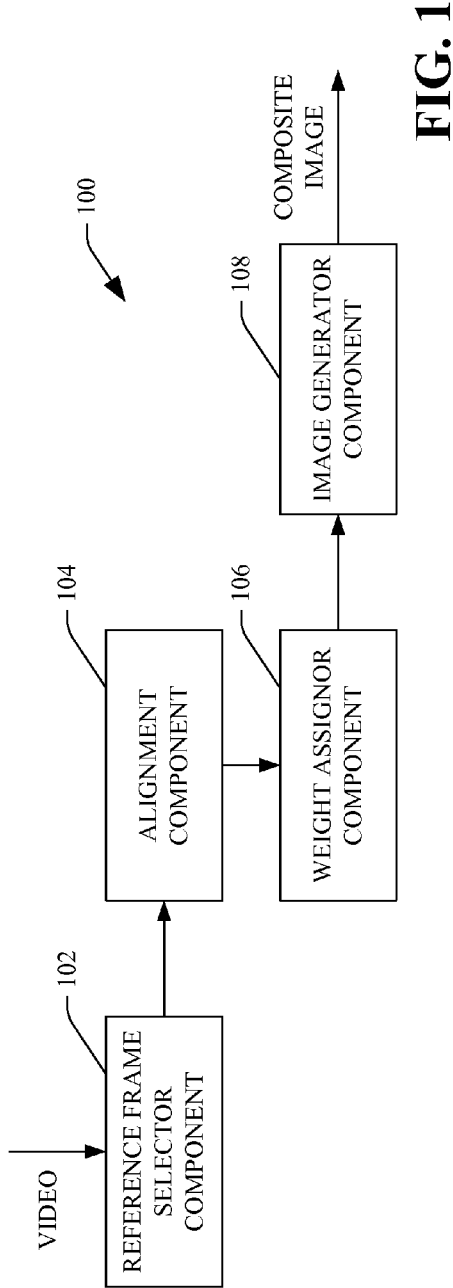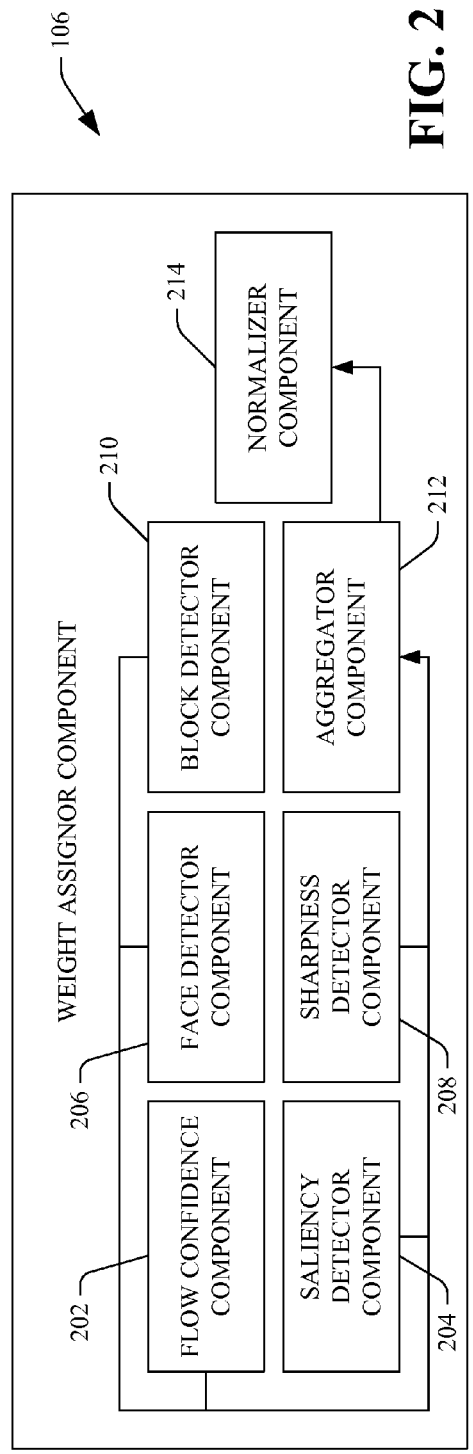

GENERATING A COMPOSITE IMAGE FROM VIDEO FRAMES

BACKGROUND

An individual capturing a still image through utilization of a camera faces the task of trying to capture the image at the "perfect" moment, only to later realize that the camera shutter opened too early or too late to capture such moment adequately. Thus, for instance, in a family photograph, a person may be captured with their eyes closed or frowning. As can be understood by those that have utilized a camera, capturing an image at the precise moment in time is often a matter of photographic skill and timing (and in some instances luck).

Capturing a video sequence can ensure that a certain moment is not missed. Further, many consumer level devices are now being equipped with video capture capability, including mobile telephones, portable media players, and the like. Therefore, if an individual wishes to capture a scene or action, such individual is not likely to miss important events.

Utilizing a video camera instead of a still camera, however, is conventionally associated with a cost. Consumer level video cameras do not output images with the same quality as images captured by way of a still camera (which are of higher resolution and with less noise). Moreover, still images are generally preferable to video for display in a home or office (e.g., in a picture frame) and online sharing (e.g., email and photo-sharing websites).

SUMMARY

The following is a brief summary of subject matter that is described in greater detail herein. This summary is not intended to be limiting as to the scope of the claims.

Described herein are various technologies pertaining to generating a composite image from a plurality of images that are sequential in time (a plurality of video frames), wherein the composite image may include aspects of various ones of the plurality of sequential images. Therefore, while no single image may capture the "perfect" moment, the composite image may combine aspects of different ones of the sequential images to create such moment.

A framework described herein for generating composite images may first analyze a plurality of sequential images and ascertain whether the composite image is desirably a panoramic image or an image of a particular scene focused on by the individual capturing the scene via a video camera, for instance. If it is determined that a panoramic image is desirably generated, the framework can support stitching together portions of the sequential images to generate a panoramic image of a scene.

If it is determined that a composite image of a particular scene is desired by the individual, then a composite image can be generated based at least in part upon importance weights assigned to pixels of the images in the sequence of images. In an example, at least one importance weight can be assigned to each pixel in each of the images in the sequence of images. The importance weights can be based upon a variety of factors. For instance, the importance weights can be based at least in part upon detection of salient (or unique) objects or areas in images, detection of faces in images, determined sharpness of an image, alignment between pixels of images, compression quality of an image, etc. Each pixel may have multiple importance weights assigned thereto, and such importance weights can be aggregated and normalized. Thereafter, pixels from images can be selected to include in a composite image based at least in part upon aggregated normalized weights assigned to such pixels.

Additionally, the composite image can be a higher resolution image when compared to resolution of images in the sequence of images, such that the composite image preserves salient objects in the original images, but the background is enhanced. This can be undertaken through video enhancement operations such as multi-image super-resolution, denoising, and/or deblurring.

Other aspects will be appreciated upon reading and understanding the attached figures and description.

BRIEF DESCRIPTION OF THE DRAWINGS

FIG. 1 is a functional block diagram of an example system that facilitates generating a composite image from a plurality of video frames.

FIG. 2 is a functional block diagram of an example component that facilitates assigning importance weights to pixels of frames in a video sequence for utilization in connection with generating a composite image.

DETAILED DESCRIPTION

Figure 3:
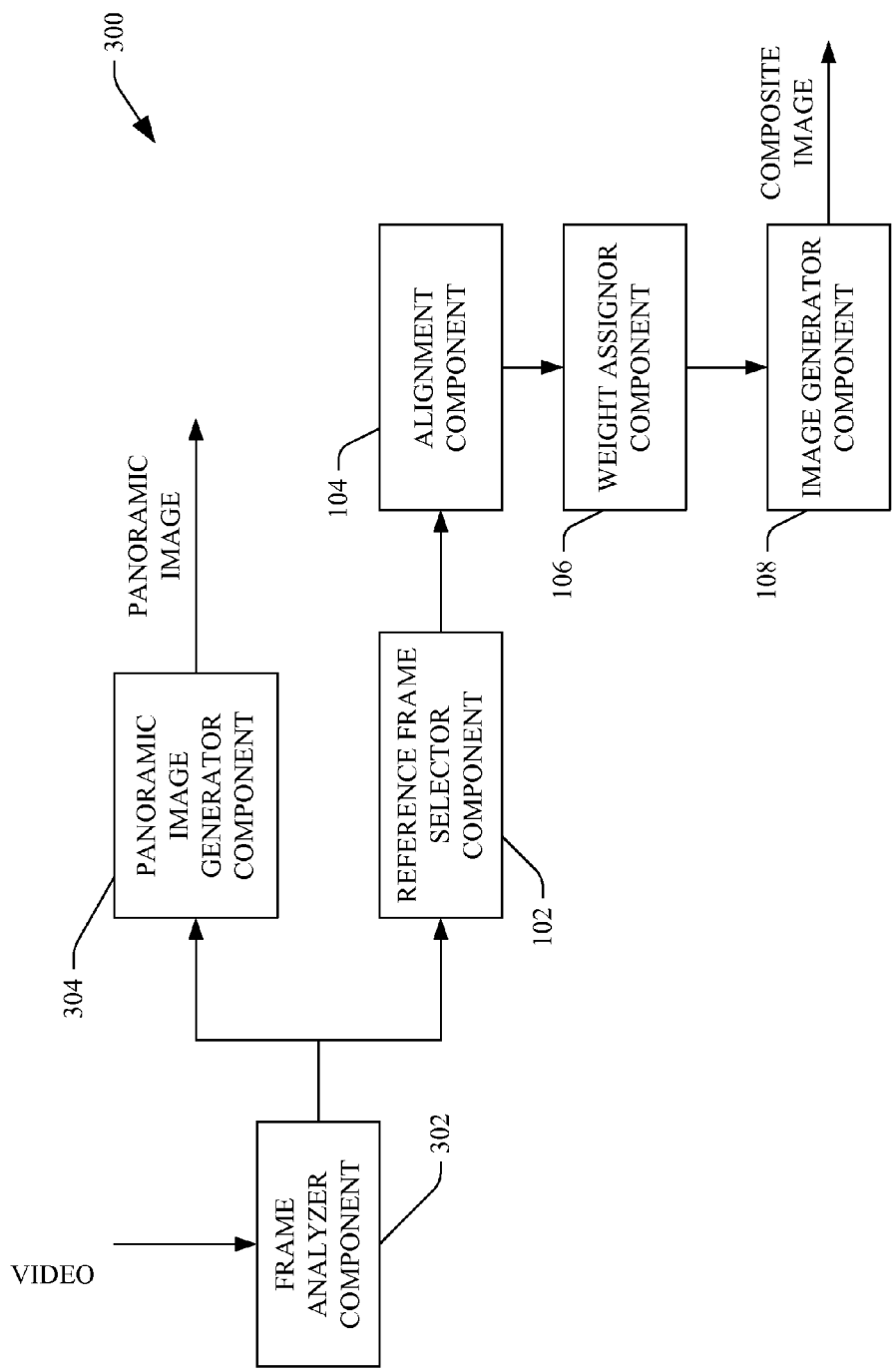
FIG. 3 is a functional block diagram of an example system that facilitates generating a panoramic image or a composite image from a plurality of video frames.

Various technologies pertaining to generating a composite image from a plurality of video frames will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates generating a composite image from a plurality of video frames is illustrated. The system 100 can generate a composite image such that the composite image comprises the "best" portions of each frame of a video, to create an interesting and desirable still image from the frames of captured video. In an example, the system 100 may be comprised by a mobile computing device, such as a mobile telephone or multimedia player. In another example, a conventional computing device, such as a desktop computer, may comprise the system 100, such that the system 100 may be included as a computer programming product for generating images. In still yet another example, the system 100 may be included in a cloud computing system, and operation of the system 100 may be provided as a cloud computing service.

The system 100 includes a reference frame selector component 102 that receives a video sequence, wherein the video sequence comprises a plurality of sequential video frames. In an example, the video frames may be captured at a rate of fifteen frames per second or greater. It is to be understood, however, that the frame rate can be any suitable frame rate depending upon motion in a scene being captured. For instance, if the scene includes relatively little motion, the frame rate may be low (e.g., a capture rate of a frame a minute, a frame an hour, etc.). The reference frame selector component 102 can automatically select at least one frame in the video frames to act as a reference frame. The reference frame may be selected based upon any suitable criteria. For example, the reference frame selector component 102 can select a reference frame by selecting a most unique frame amongst all the frames, wherein uniqueness may be uniqueness of color, uniqueness with respect to saliency, etc. In another example, the reference frame may include a frame that comprises a greatest number of human faces when compared to numbers of human faces visible in other frames. In another example, the reference frame selector component 102 may select the sharpest frame or the frame with the best compression quality. In yet another example, rather than utilizing the reference frame selector component 102 to automatically select a reference frame in the video, an individual may manually select a reference frame.

An alignment component 104 may be in communication with the reference frame selector component 102 and can receive the selected reference frame. Positions of objects captured in the scene can move with respect to the objects from frame to frame, wherein such change of position can be caused by motion of the video camera and/or objects in the scene moving with respect to the camera. The alignment component 104 can perform a global alignment that acts to globally stabilize camera motion. Pursuant to an example, the alignment component 104 can compute motion of the camera between the reference frame selected by the reference frame selector component 102 and other frames in the video by, for example, estimating a global affine warp using interest points or, in another example, a blockwise full frame affine registration.

Once the alignment component 104 has computed a global alignment with respect to frames in the video pertaining to the reference frame, the alignment component 104 can compute local alignment of objects in the frames. The alignment component 104 can undertake such local alignment to detect objects in a scene that are moving. The global motion between the reference frame and the kth frame in the video can be denoted by $T^k$. The alignment component 104 may also be configured to estimate a noise level in the reference frame selected by the reference frame selector component 102 through utilization of any suitable noise level estimation technique. In an example, the global and local alignment technique utilized by the alignment component 104 may be referred to as optical flow, which can be understood and recognized by one skilled in the art.

A weight assignor component 106 may be in communication with the alignment component 104, and can automatically and independently assign importance weights to each pixel in each frame of the video. As will be described in greater detail below, importance weights assigned to a pixel may be based at least in part upon how well the alignment process undertaken by the alignment component 104 was able to align pixels between adjacent frames or frame that is an average of several frames. The more closely a pixel in a frame is aligned with a corresponding pixel in an adjacent frame or an averaged frame, the higher the weight assigned to such a pixel by the weight assignor component 106.

In another example, importance weights assigned to pixels by the weight assignor component 106 can be based at least in part upon saliency of objects in a frame. Therefore, the weight assignor component 106 can determine how unique an appearance of a pixel is in a frame, how unique motion of an object is in a frame, etc. In still yet another example, the weight assignor component 106 can assign the importance weights to pixels in the frames based at least in part upon whether the frames include faces, such that frames that include faces have higher weights assigned to such pixels than frames that do not include faces. Of course other objects can be detected, and importance weights can be assigned to any suitable object, such as a detector that detects whether a person is smiling, etc. In still yet another example, the weight assignor component 106 can assign weights to pixels based at least in part upon either the global sharpness of a frame that includes the pixels or the local sharpness of the neighborhoods of the pixels. Still further, the weight assignor component 106 can assign weights to pixels based at least in part upon existence of blocking artifacts pertaining to pixels. Again, importance weights assigned to pixels in the video frames will be described in greater detail below.

An image generator component 108 can receive the importance weights assigned to the pixels by the weight assignor component 106 and can generate a composite image that is based at least in part upon the importance weights assigned by the weight assignor component 106. The composite image generated by the image generator component 108 can include aspects of a plurality of different frames of the video. In an example, if the weight assignor component 106 is configured to assign high weights to pixels where a smile is detected, a video of a family for a family photograph can be received, and the weight assignor component 106 can assign high weights to pixels that include smiling faces. The image generator component 108 can output the composite image such that each member of the family is shown to be smiling, even if not all members of the family were smiling in any individual frame.

Furthermore, the image generator component 108 can be configured to generate the composite image such that the composite image is of higher resolution than resolution of frames in the video, and the composite image has reduced noise compared to frames in the video. Multi-image restoration operations (such as super-resolution) assume an image formation model that converts a high quality input (a high resolution image) into a degraded image sequence (a low resolution video). The restoration problem involves using the multiple degraded observations to invert this image formation model and estimate the high-quality input. The system 100 introduces the importance-based weights into such inversion process. While the system 100 can be applied to any image formation model, it will be discussed herein in the context of super-resolution.

Given a set of N video frames $I_l^k$, k=1, 2, . . . N of resolution h×w, multi-image super-resolution seeks to combine and upsample the frames to obtain a single high resolution sh×sw image $I_h$. The standard super-resolution problem assumes a generative image formation given by the following algorithm:

$$I_l^k = D_s(P^k(T^k I_h)) + \eta^k \quad (1)$$

where $T^k$ is a transformation of the high resolution image (and encodes camera and scene motion) for the kth image, $P^k$ combines the effect of a camera's anti-aliasing filter and defocus blur, $D_s$ is a decimation by factor s, and $\eta^k$ is the observation noise.

$D_s$, $P^k$ and $T^k$ can all be linear operators, and can be combined into a single operation $M^k(\cdot)=D_s(P^k(T^k(\cdot)))$. Also, since the characteristics of the video camera capturing the low resolution video frames are unlikely to change during the imaging process, the noise function can optionally be approximated as staying constant, $\eta^k=\eta$, $k=1, 2, \ldots, N$. It is to be understood, however, that the noise level can vary over frames and even over pixels in a frame. The noise level (per frame and/or per pixel) can be estimated through any suitable estimation technique, and such estimated noise level can be incorporated into the framework described herein. Under the assumption of zero mean Gaussian noise, $\eta \sim N(0,\sigma_\eta^2)$ ($\sigma_\eta$ can be estimated using any suitable method), this reduces to solving for $I_h$ by minimizing the following energy function:

$$E_d = \sum_{k=1}^{N} \frac{\|(I_l^k - M^k I_h)\|^2}{\sigma_\eta^2}. \tag{2}$$

While multi-image super-resolution is better conditioned than single-image super-resolution, errors in alignment, exaggeration, noise, etc. can make solving equation (2) difficult. This can be handled by regularizing the solutions with a prior, giving the total energy to minimize via the following algorithm:

$$E_t = \sum_{k=1}^{N} \frac{\|(I_l^k - M^k I_h)\|^2}{\sigma_\eta^2} + E_p(I_h). \tag{3}$$

$E_p$ can take a number of forms, wherein one choice is the sparse prior on the distribution of image gradients: $E_p(I_h)=(\nabla I_h)^{0.8}$.

Equation (2) represents the standard multi-image super-resolution problem. In this formulation, every output pixel $I_h(x, y)$ is a linear combination of all pixels $I_l^k(x, y)$, $k=\{1,2,\ldots N\}$ aligned with such pixel. This is in contrast to discretely selecting every output pixel $I_h(x, y)$ from the corresponding set of input pixels $I_l^k(x, y)$. The image generator component 108 bridges the gap between averaging many low resolution pixels and discretely picking a low resolution pixel by utilizing the importance weights generated by the weight assignor component 106. Specifically, the image generator component 108 can generate the composite image through utilization of the following equation:

$$E_d = \sum_{k=1}^{N} \frac{\|W^k\{I_l^k - M^k I_h\}\|^2}{\sigma_\eta^2}. \tag{4}$$

$W^k(x, y)$ can be used to decide how the low resolution pixels $I_l^k(x, y)$ are combined to produce the output high resolution pixels $I_h(x, y)$. By utilizing equal weights (e.g., $W^k(x, y)=1 \forall k$), Equation (4) reduces to the original super-resolution problem of Equation (2). On the other hand, using sparse weights (e.g., $W^k(x, y) \in \{1, 0\}$, $\Sigma_k W^k(x, y)=1$), Equation (4) reduces to discretely selecting pixels. Since the weights are defined per pixel, both of these scenarios can be combined in the same framework. Thus, non-salient portions of frames can be combined while salient regions can be preserved from single frames.

Referring now to FIG. 2, an example depiction of the weight assignor component 106 is illustrated. The weight assignor component 106 can provide weights to individual pixels in the frames of a video. While the weight assignor component 106 is shown as generating particular feature weights for pixels in frames in the video, it is to be understood that the weight assignor component 106 may be configured to generate additional or alternative weights for pixels in the frames of the video. The weight assignor component 106 can comprise a flow confidence component 202 that can output a flow confidence per pixel, per frame of the video. The flow confidence is indicative of how well pixels align with one another. One skilled in the art will appreciate that motion estimation is a difficult vision problem, and optical flow algorithms can make errors while handling general scenes with arbitrary camera motion. The flow confidence component 202 can be configured to mitigate artifacts in the composite image generated by the image generator component 108, wherein the artifacts can be caused by the aforementioned errors. For example, the flow confidence component 202 can be configured to output weights based upon a re-projection error of the estimated motion:

$$W_{flow}^k(x,y) = N(I_l^{ref}(x,y); T^k(I_l(x,y)), \sigma_\eta^2), \tag{5}$$

where $W_{flow}^k(x, y)$ is the flow confidence of a pixel at position x, y for the kth video frame, N is a number of frames, $I_l^{ref}$ is the reference frame, $T^k$ is a transformation of the $k^{th}$ low resolution image (and encodes camera and scene motion), and $\sigma_\eta$ is an estimated noise level in the reference image.

A saliency detector component 204 can be configured to output weights that are indicative of saliency of objects in video frames. The saliency detector component 204 can utilize any suitable saliency measure in connection with generating such weights. In general, the saliency detector component 204 can analyze the frames in the video and search for uniqueness of appearance and/or motion pertaining to pixels. Thus, a weight output by the saliency detector component 204 for a particular pixel can be indicative of uniqueness of such pixel for a particular frame. A pixel can be deemed to be unique with respect to a number of aspects such as intensity, color, motion, etc. To output such uniqueness measure, the saliency detector component 204 can analyze differences between pixels of neighboring frames. In another example, a background frame can be computed by median filtering aligned video frames. The saliency detector component 204 may then output a saliency measure by estimating the temporal saliency of each video frame by looking at deviations from the background frame or neighboring frames. In another example, the saliency detector component 204 may analyze the optical flow computed by the alignment component 104 and output a saliency measure based on differences in the motion. It is to be understood, however, that the saliency detector component 104 can utilize any suitable technique to output a measure of saliency with respect to frames and/or pixels.

The weight assignor component 106 may further include a face detector component 206 that assigns weights to pixels and frames based at least in part upon whether a frame includes a face. Including the face detector component 206 in the weight assignor component 106 assumes that frames that include faces are more interesting to the photographer or videographer than frames that do not include faces. Pursuant to an example, the face detector component 206 can assign per frame weights based upon a number of faces detected in a frame. Additionally or alternatively, the face detector component 206 can output per-frame weights on the area of faces detected (which emphasizes frames that include faces captured at higher resolution). While the weight assignor component 106 is shown including the face detector component 206, it is to be understood that the weight assignor component 106 may include any suitable detector for any object. For example, if the videographer wished to capture images of nature, then the weight assignor component 106 could include a detector configured to detect presence of animals or certain types of plant life in a frame. In another example, if the videographer wishes to capture frames or assign greater weight to frames that include people are smiling, the weight assignor component 106 may include a detector that is configured to detect smiles in frames, and weights can be assigned to pixels/frames based at least in part upon detection of smiles.

The weight assignor component 106 may also include a sharpness detector component 208 that detects sharpness of frames/pixels. Motion blur due to camera or scene motion, and defocus blur due to an out-of-focus camera, may degrade the quality of the video. The sharpness detector component 208 can be utilized to discard frames that are heavily blurred, while preferring frames that are sharper (by assigning higher weights to pixels in sharp frames when compared to weights assigned to pixels in less sharp frames). For example, the sharpness detector component 208 can use two forms of sharpness-based weighting schemes. The first can be a global sharpness measure that can be defined for every frame as the sum of the gradients, wherein the global sharpness measure can be generated through utilization of the following algorithm:

$$W_{gs}^k(x,y) = \Sigma_m \Sigma_n (\nabla I_{l,x}^k(m,n))^2 + (\nabla I_{l,y}^k(m,n))^2, \quad (6)$$

where $W_{gs}^k$ is the global sharpness measure for a kth image in the sequence of images and $\nabla I_{l,x}^k$ and $\nabla I_{l,y}^k$ are the x and y gradients and are computed as finite differences.

The first weighting scheme can assign a substantially similar weight to all pixels of a frame, and can be utilized to distinguish blurry frames from sharp frames. To specify sharpness based weights per pixel, the sharpness detector component 208 can define local sharpness weights as the sum of gradients in a local neighborhood around a picture by way of the following algorithm:

$$W_{ls}^k(x, y) = \sum_{m=x-r}^{x+r} \sum_{n=y-r}^{y+r} (\Delta I_{l,x}^k(m, n))^2 + (\Delta I_{l,y}^k(m, n))^2, \quad (7)$$

where $W_{ls}^k$ is the global sharpness measure for a kth image in the sequence of images, r is predefined constant, and $\nabla I_{l,x}^k$ is an x gradient and $\nabla I_{l,y}^k$ is a y gradient.

The weight assignor component 106 may further comprise a block detector component 210 that can detect blocking artifacts in video frames. Low quality video sequences are often heavily compressed, and may suffer from blocking artifacts. Since, for instance, 8×8 patches of the frames may be compressed separately, blocking artifacts may be visible at the boundaries of the blocks. So that the artifacts are not visible in the output of the composite image, pixels can be downweighted on block boundaries through the following algorithm:

$$W_{block}^k(x, y) = \begin{cases} 0.01 & x \bmod 8 = 0, y \bmod 8 = 0 \\ 1.00 & \text{otherwise.} \end{cases} \quad (8)$$

The starting index for x and y is 0.

An aggregator component 212 can receive the weights output by the flow confidence component 202, the saliency detector component 204, the face detector component 206, the sharpness detector component 208, and the block detector component 210 for each pixel for each frame, and can combine such weights to a single weight for each pixel for each frame. The aggregator component 212 can combine such weights by exponentiating and scaling each of the weights generated by the aforementioned components and summing such weights together via the following algorithm:

$$W_{total}^k = \Sigma_{f \in features} \lambda_f (W_f^k)^{r_f}. \quad (9)$$

The exponential $r_f$ can be varied to transition between uniform and sparse weights. Such exponential can be varied in accordance with desires of the videographer/photographer.

A normalizer component 214 can receive the combined weights for pixels in the frames, and can normalize such weights. Directly applying weights computed by the aggregator component 212 can skew the mass of the energy function toward high weight pixels, and can result in a composite image where only the high weight pixels are adequately computed, while the rest do not move far from the initialization. The normalizer component 214 can mitigate this possibility by normalizing weights, so that every aligned set of pixels contributes the same error to the total energy. This can be done by first warping the weights by the motion estimation on the video frames, normalizing them, and the unwarping them as shown in the following algorithm:

$$W^k = (T^k)^{-1} \left\{ T^k(W_{total}^k) \Big/ \sum_{k=1}^{N} T^k(W_{total}^k) \right\}. \quad (10)$$

Such normalized weights output by the weight assignor component 106 can be received by the image generator component 108, and the image generator component 108 can generate the composite image based at least in part upon the normalized weights.

With reference now to FIG. 3, an example system 300 that facilitates determining whether to generate a composite image or a panoramic image is illustrated. The system includes a frame analyzer component 302 that receives video and analyzes frames of such video. For example, the frame analyzer component 302 can attempt to align frames of the video to see how closely such frames are aligned (or misaligned). If the frames are highly misaligned, the frame analyzer component 302 can infer that the videographer wishes to generate a panoramic image from the video frames. A panoramic image generator component 304 may then receive the video frames, align such frames, and stitch portions of the frames together to generate a panoramic image. The panoramic image generator component 304 may utilize any suitable stitching technique to stitch together portions of frames of the video to generate the panoramic image.

If the frame analyzer component 302 infers that the videographer wishes to generate a composite image, then the frame analyzer component 302 can output such indication and the reference frame selector component 102 can act as described above to select a reference frame from the video. Thereafter, the alignment component 104, the weight assignor component 106, and the image generator component 108 can act as described above to cause the composite image to be generated.

As indicated infra, the frame analyzer component 302 may align frames to ascertain whether the videographer wishes to generate a panoramic image or a composite image. In another example, the video camera may include an accelerometer or some other suitable sensor that can determine an indication of movement of the video camera. The frame analyzer component 302 can analyze this movement over time, and based upon such movement can determine whether the videographer wished to generate a panoramic image or the composite image. For instance, if the individual attempted to hold the camera relatively still for a short period of time (e.g., 10 seconds), then the frame analyzer component 302 can infer that the videographer wished to generate a composite image. Alternatively, if the frame analyzer component 302 determines that the videographer moved the camera in a panning motion, then the frame analyzer component 302 can infer that the videographer wished to generate a panoramic image.

Figure 4:
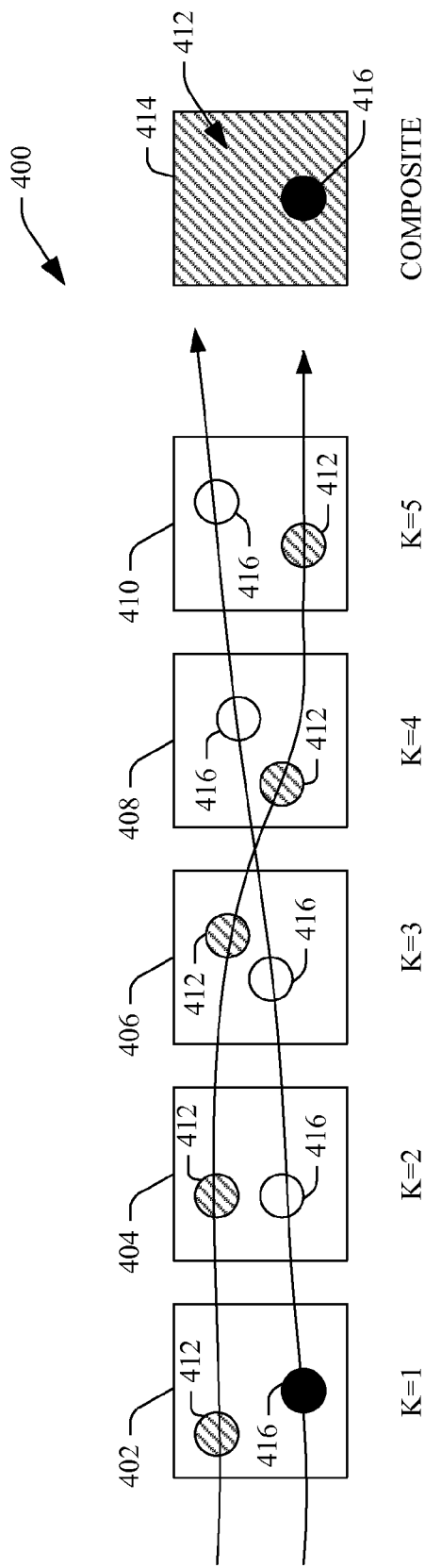
FIG. 4 is an example depiction of tracking a salient object in a video frame.

Now referring to FIG. 4, an example depiction of generating a composite image based upon weights assigned to portions of such image is illustrated. FIG. 4 depicts a plurality of frames 400, wherein the plurality of frames 400 includes a first frame 402, a second frame 404, a third frame 406, a fourth frame 408, and a fifth frame 410. Manipulating weights allows the handling of multi-image enhancement operations while preserving salient objects. For example, each of the frames 402-410 may include a patch 412, and the weights for such patch can be equal (e.g., $W^0 = \ldots = W^4$). In a composite image 414, the output patch 412 can be a linear combination of all of the input patches $A^k$, as in Equation (2). A second patch 416 may have weights that are non-zero only for the first frame 402. This weight can indicate that the patch 416 is relatively unique (salient). Thus, in the composite image 414 the patch 416 can be copied from the first frame 402. Therefore, nonsalient portions of the frames 402-410 can be combined to generate a relatively high-resolution background, while the salient patch 416 can be copied from the first frame 402 and preserved in the composite image 414.

Figure 5:
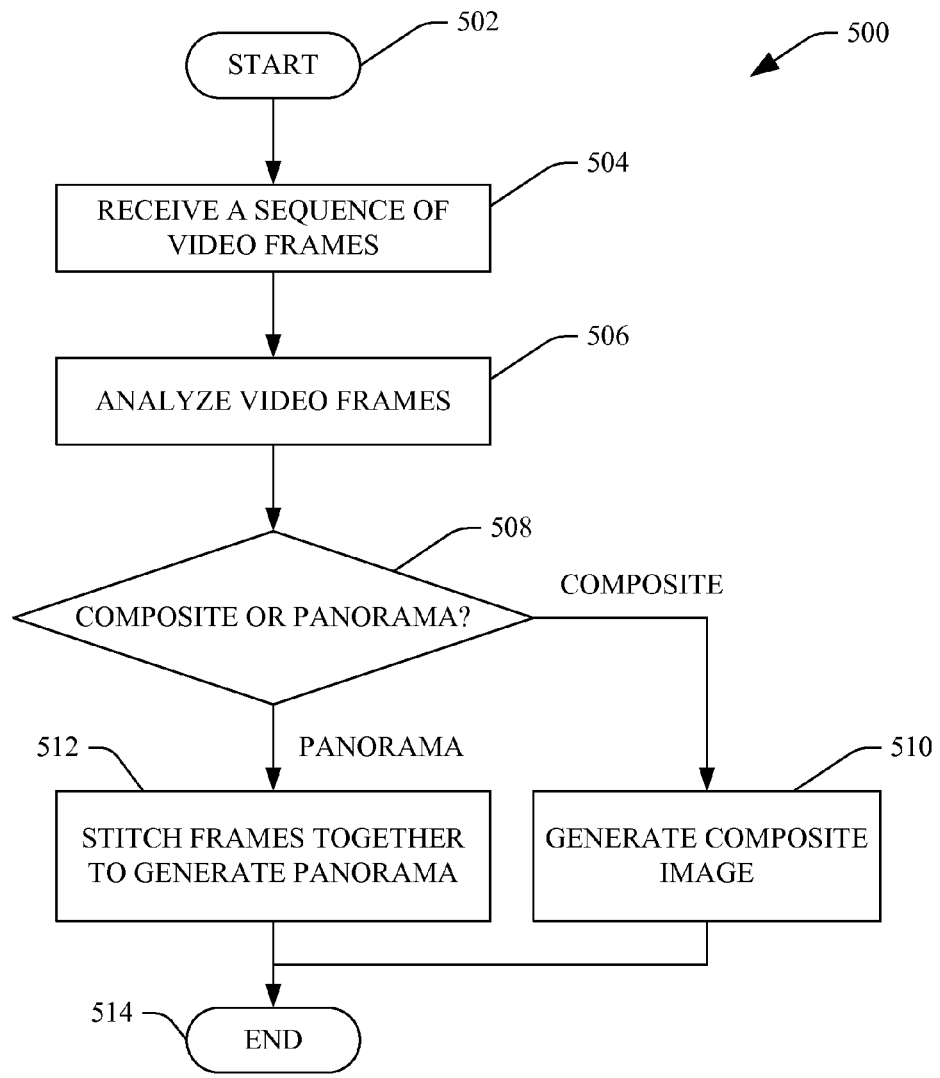
FIG. 5 is a flow diagram that illustrates example methodology for determining whether to generate a composite image or a panoramic image.
Figure 6:
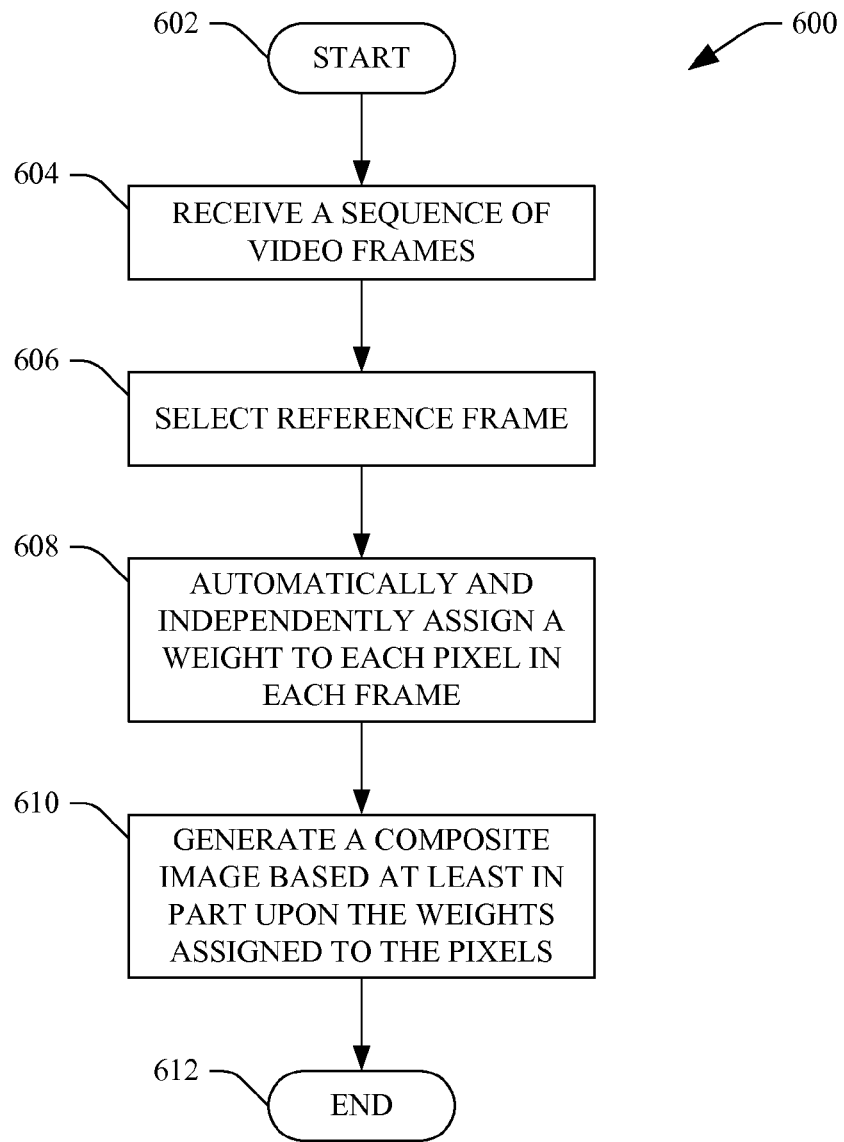
FIG. 6 is a flow diagram that illustrates an example methodology for generating a composite image based at least in part upon importance weights assigned to pixels of video frames.
Figure 7:
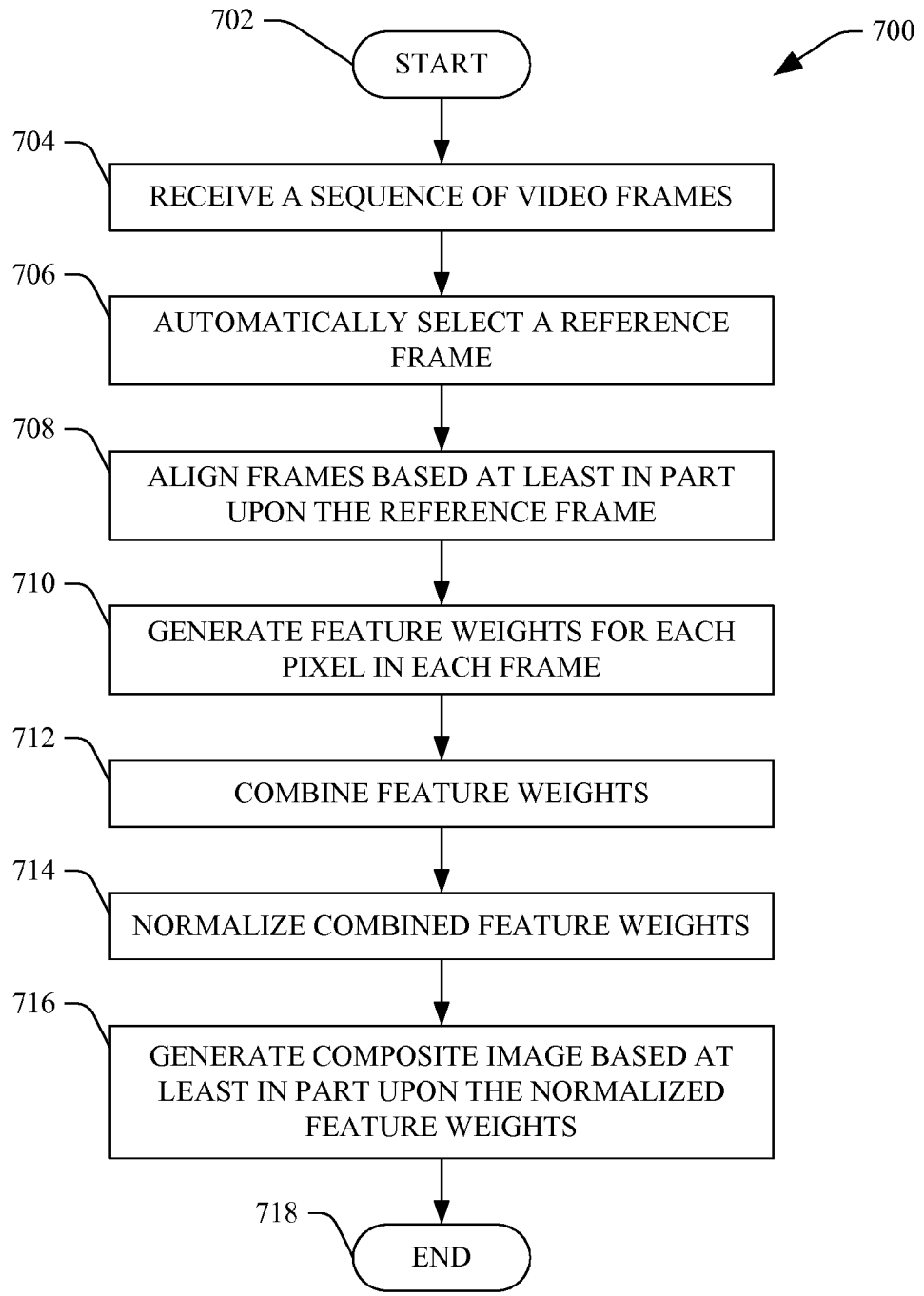
FIG. 7 is a flow diagram that illustrates an example methodology for generating a composite image based at least in part upon normalized importance weights assigned to pixels in video frames.
Figure 8:
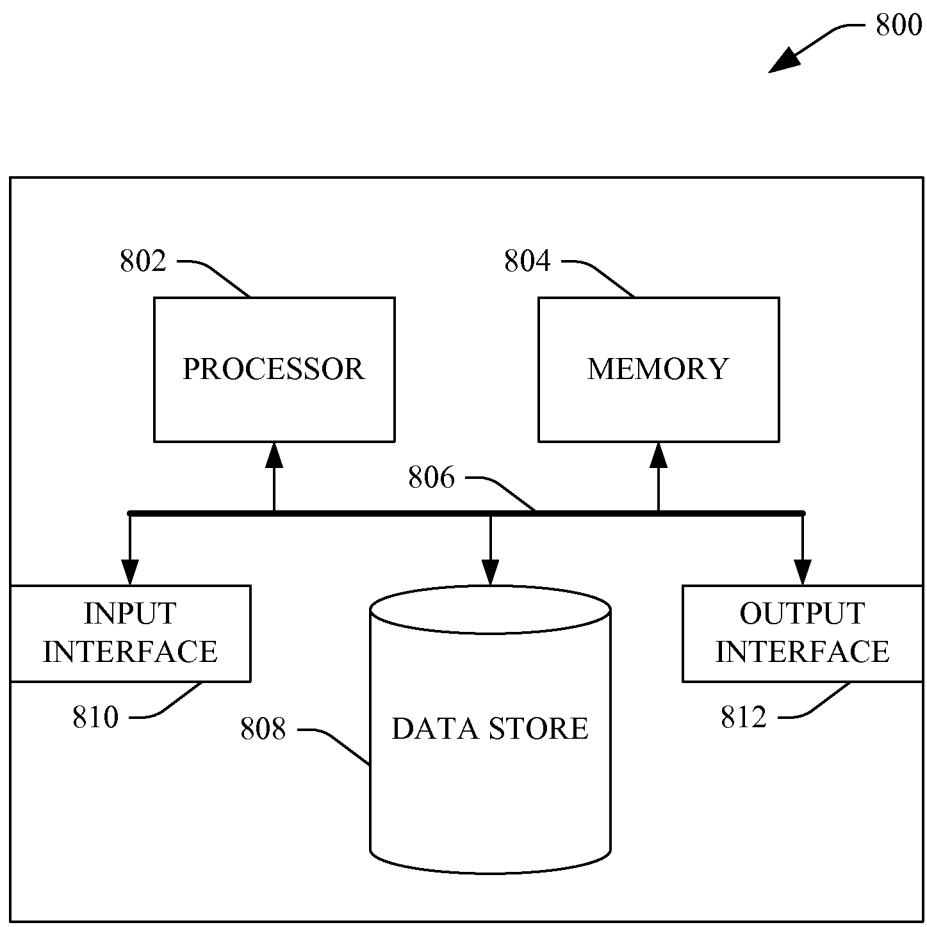
FIG. 8 is an example computing system.

With reference now to FIGS. 5-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 5, a methodology 500 that facilitates determining whether to generate a panoramic image or a composite image from a plurality of video frames is illustrated. The methodology 500 begins at 502, and at 504 a sequence of video frames is received. For example, the sequence of video frames may be received from a consumer level video camera that is included in a mobile phone. At 506 the video frames are analyzed. For instance, the frames can be attempted to be aligned with respect to one another, and/or sensor data pertaining to the device utilized to capture the video can be analyzed.

At 508 a determination is made regarding whether the videographer wished to generate a composite image or a panoramic image. If the videographer wished to generate a composite image, at 510 the composite image is generated based at least in part on importance weights assigned to pixels in frames of the video. If a panoramic image is desirably generated, then at 512 portions of frames are stitched together to generate a panoramic image. The methodology 500 completes at 514.

Now referring to FIG. 6, an example methodology 600 that facilitates generating a composite image based at least in part upon importance weights assigned to pixels is illustrated. The methodology 600 starts at 602, and at 604 a sequence of video frames is received. Alternatively, a sequence of still images can be received, wherein the images are captured from a digital camera and are arranged with respect to one another by time. Such still images can be images of a substantially similar scene.

At 606 a reference frame (image) is selected. This reference frame can be automatically selected or manually selected by the videographer. At 608, weights are automatically and independently assigned to each pixel in each frame/image of the video received at 604. At 610 a composite image is generated based at least in part upon the weights assigned to the pixels. The methodology completes at 612.

Turning now to FIG. 7, a methodology 700 that facilitates generating a composite image based at least in part upon normalized feature weights is illustrated. The methodology starts at 702, and at 704 a sequence of video frames is received. At 706 a reference frame is automatically detected, for instance through utilization of a saliency detector. At 708 frames are aligned with respect to one another based at least in part upon the reference frame. For example, the alignment may include a global alignment that attempts to capture global motion of the camera, as well as a local alignment that captures movement of objects in a scene.

At 710 a plurality of feature weights are generated for each pixel in each frame. As indicated above, feature weights may indicate flow confidence, saliency of objects, whether the pixel corresponds to a face, etc. At 712 the plurality of feature weights can be combined for each pixel. At 714 the combined features can be normalized, and at 716 a composite image can be generated based at least in part upon the normalized feature weights. The methodology then completes at 718.

Now referring to FIG. 9, a high-level illustration of an example computing device 800 that can be used in accordance with the systems and methodologies disclosed herein is illustrated. For instance, the computing device 800 may be used in a system that supports generating a composite image. In another example, at least a portion of the computing device 800 may be used in a system that supports determining whether or not to generate a panoramic image or a composite image from a plurality of video frames. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store sequences of video, importance weights, etc.

The computing device 800 additionally includes a data store 808 that is accessible by the processor 802 by way of the system bus 806. The data store 808 may include executable instructions, importance weights for various pixels, images, etc. The computing device 800 also includes an input interface 810 that allows external devices to communicate with the computing device 800. For instance, the input interface 810 may be used to receive instructions from an external computer device, a mobile telephone, an individual, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Still further, a component may be a portion of memory accessed by a processor and/or a plurality of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving a sequence of images of a scene, the sequence of images comprising a plurality of images, each image in the plurality of images comprising a respective plurality of pixels;
   receiving an indication of a reference image in the sequence of images;
   for each pixel in each image of the plurality of images, assigning a respective first weight that is indicative of saliency of a respective pixel, wherein the saliency of the respective pixel is indicative of an importance of preserving an object that corresponds to the respective pixel in a composite image; and
   generating the composite image based at least in part upon weights indicative of saliency assigned to the respective plurality of pixels in each image in the plurality of images and the indication of the reference image, wherein the composite image comprises the object, the object being absent from at least one image in the plurality of images.

2. The method of claim 1, wherein the sequence of images are frames of a video sequence.

3. The method of claim 1 configured for execution in a mobile telephone.

4. The method of claim 1, wherein the reference image is manually selected by an individual.

5. The method of claim 1, further comprising automatically selecting the reference image based at least in part upon one or more predefined features pertaining to the reference image.

6. The method of claim 1, further comprising:
   for each pixel in each image of the plurality of images, assigning a respective second weight that is indicative of flow confidence of the respective pixel; and
   generating the composite image based at least in part upon weights indicative of flow confidence assigned to the respective plurality of pixels in each image in the plurality of images.

7. The method of claim 6, wherein the second weight is computed by way of the following algorithm:

$$W_{flow}^k(x,y) = N(I_l^{ref}(x,y); T^k(I_l(x,y)), \sigma_\eta^2),$$

where $W_{flow}^k(x, y)$ is the flow confidence of the respective pixel at position x, y for the kth image in the sequence of images, N is a number of images in the sequence of images, $I_l^{ref}$ is the reference image, $T^k$ is a transformation of a high resolution image, and $\sigma_\eta$ is an estimated noise level in the reference image.

8. The method of claim 1, further comprising:
   for each pixel in each image of the plurality of images, assigning a respective second weight that is indicative of a sharpness measure of the respective pixel; and
   generating the composite image based at least in part upon weights indicative the sharpness measure assigned to the respective plurality of pixels in each image in the plurality of images.

9. The method of claim 8, wherein the sharpness measure is a global sharpness measure that is defined for each image in the sequence of images via the following algorithm:

$$W_{gs}^k(x, y) = \sum_m \sum_n (\nabla I_{l,x}^k(m, n))^2 + (\nabla I_{l,y}^k(m, n))^2,$$

where $W_{gs}^k$ is the global sharpness measure for a kth image in the sequence of images, $\nabla I_{l,x}^k$ is an x gradient and $\nabla I_{l,y}^k$ is a y gradient.

10. The method of claim 8, wherein the sharpness measure is a local sharpness measure that is defined per pixel for each image in the sequence of images via the following algorithm:

$$W_{ls}^k(x, y) = \sum_{m=x-r}^{x+r} \sum_{n=y-r}^{y+r} (\nabla I_{l,x}^k(m, n))^2 + (\nabla I_{l,y}^k(m, n))^2,$$

where r is predefined constant, $W_{ls}^k$ is the global sharpness measure for a kth image in the sequence of images, $\nabla I_{l,x}^k$ is an x gradient and $\nabla I_{l,y}^k$ is a y gradient.

11. The method of claim 1, further comprising:
   assigning, to each image in the plurality of images, a respective second weight that is based upon a number of faces detected in a respective image in the plurality of images; and
   generating the composite image based at least in part upon the respective second weight.

12. The method of claim 1, wherein the composite image comprises multiple visualizations of the object in respective different positions to depict motion of the object as captured in the sequence of images.

13. A system comprising the following computer-executable components:
   a weight assignor component that assigns a respective weight to each pixel in a plurality of frames of video of a scene, wherein the respective weight assigned to a respective pixel is indicative of importance of preserving an object that corresponds to the respective pixel in a composite image; and
   an image generator component that generates the composite image of the plurality of frames of video based at least in part upon the respective weight assigned to the respective pixel, wherein the composite image comprises multiple visualizations of an object in respective different positions to depict motion of the object as captured in the plurality of frames of video.

14. The system of claim 13, wherein the weight assignor component and the image generator component are comprised by a mobile telephone.

15. The system of claim 13, wherein the weight assignor component comprises a flow confidence component that outputs a second weight for at least one pixel based at least in part upon an alignment of the at least one pixel with respect to a corresponding pixel in a different frame of the video, and wherein the image generator component generates the composite image based at least in part upon the second weight.

16. The system of claim 13, wherein the weight assignor component comprises a face detector component that detects existence of human faces in the frames of the video, wherein the weight assignor component assigns a second weight to a pixel included in a frame based at least in part upon a number of faces in the frame as detected by the face detector component, and wherein the image generator component generates the composite image based at least in part upon the second weight.

17. The system of claim 16, wherein the weight assignor component comprises a sharpness detector component that detects sharpness of pixels in a frame, wherein the weight assignor component assigns a second weight to a pixel based at least in part upon a sharpness detected by the sharpness detector, and wherein the image generator component generates the composite image based at least in part upon the second weight.

18. The system of claim 13, wherein the object is not existent in at least one frame in the plurality of frames of video.

19. A computer-readable data storage device comprising instructions that, when executed by a processor, cause the processor to perform acts comprising:
  receiving video, wherein the video comprises a plurality of frames;
  automatically selecting a reference frame amongst the plurality of frames;
  aligning other frames in the video based at least in part upon the reference frame;
  generating a first feature weight for each pixel in each of the frames of the video, wherein the first feature weight is indicative of flow confidence with respect to a pixel based at least in part upon the aligning of the other frames;
  generating a second feature weight for each pixel that is indicative of saliency pertaining to each pixel;
  generating a third feature weight for each pixel that is indicative of global sharpness of a frame;
  generating a fourth feature weight for each pixel that is indicative of sharpness of a region of a frame pertaining to each respective pixel;
  combining the first feature weight, the second feature weight, the third feature weight, and the fourth feature weight to generate a combined feature weight; and
  generating a composite image from the frames of the video based at least in part upon the combined feature weight for pixels in the frames of the video.

* * * * *